United States Patent [19]

Elliott

[11] Patent Number: 4,636,250
[45] Date of Patent: Jan. 13, 1987

[54] RECOVERY OF URANIUM ALLOY

[76] Inventor: Guy R. B. Elliott, 133 La Senda Rd., Los Alamos, N. Mex. 87544

[21] Appl. No.: 712,375

[22] Filed: Mar. 15, 1985

[51] Int. Cl.$^4$ .............................................. C22B 60/02
[52] U.S. Cl. ................. 75/84.1 A; 75/84.1 R
[58] Field of Search ......................... 75/84.1 R, 84.1 A

[56] References Cited

U.S. PATENT DOCUMENTS

| | | | |
|---|---|---|---|
| 2,754,347 | 7/1956 | Wroughton et al. | 373/142 |
| 2,918,366 | 12/1959 | Buyers et al. | 75/84.1 R |
| 3,000,726 | 9/1961 | Spedding et al. | 75/84.1 R |
| 3,049,423 | 8/1962 | Reavis et al. | 75/84.1 R |
| 3,063,829 | 11/1962 | Reavis et al. | 75/84.1 R |
| 3,164,462 | 1/1965 | Knighton et al. | 75/84.1 R |
| 3,721,549 | 7/1970 | Gallay et al. | 75/84.1 R |
| 4,252,564 | 2/1981 | Banker et al. | 75/84.1 R |
| 4,534,792 | 8/1985 | Elliott | 75/84.1 R |

OTHER PUBLICATIONS

Harrington et al. (Eds.), *Uranium Production Technology*, Van Nostrand Co. Inc., Princeton, N.J. (1959), pp. 493, 519.

*Primary Examiner*—Edward A. Miller
*Assistant Examiner*—Matthew A. Thexton

[57] ABSTRACT

Pretreatment methods are described for aiding the separation and recovery or uranium alloy from mixtures of uranium alloy with metal oxides and metal fluorides. Hydrogen fluoride converts oxides to fluorides, and magnesium converts uranium fluoride to uranium alloy. Following pretreatments, the uranium alloys are separated by melting in a molten-salt bath, or the uranium alloy may be melted as part of the pretreatment process.

5 Claims, 3 Drawing Figures

RECOVERY OF URANIUM ALLOY

BACKGROUND OF THE INVENTION

Field of the Invention

Commercial Process Background: Depleted uranium alloys are now extensively used by military forces in nonexplosive penetrators which are fired from guns against battle armor, e.g., by the main battle tanks of the U.S. Army. Such alloys also provide hard, dense material for shielding and weights, e.g., drill collars for oil-well drilling. The large-scale use of these alloys produces material which is now discarded but should be recovered and recycled. This invention relates to methods of recovering uranium alloy from various mixtures from which it is not currently recovered.

The term "uranium alloy" is used throughout this disclosure to describe both deliberately alloyed material and nominally "pure" uranium metal, with its small amounts of alloying impurities. Such uranium alloys are chemically similar, e.g., they all oxidize readily, and, therefore, distinction between pure metal and these alloys becomes chemically unnecessary and confusing in relation to the present invention.

For example, penetrators are machined from rolled rods of depleted uranium alloy; this machining creates scrap turnings which are currently buried as waste in dumps for mildly radioactive material, e.g., at Barnwell, S.C. If such scrap turnings could economically be melted, then rolled into rods, valuable uranium alloy would be saved, and environmental damage from unnecessary radioactive burial would be reduced. However, the machining generates heat, and lubricating water-oil mixtures must be used; the hot machine turnings oxidize heavily both in air and in the water-oil mixtures. The presence of such oxide (a) prevents agglomeration of molten uranium alloy, and (b) ties up uranium alloy in a form which is unrecoverable by simple melting.

Other forms of uranium alloy also become oxidized and economically unrecoverable by current technology. Uranium-alloy penetrators, for example, oxidize when they are fired into the sand of firing pits at test ranges.

Reductions of uranium fluoride by magnesium, e.g., commercial bomb reductions, frequently produce dispersed uranium-alloy product trapped in magnesium-fluoride by-product. Uranium alloy in such dispersions is not economically recoverable by current technology, and such mixtures are discarded and buried.

Because radioactive-waste disposal is expensive and valuable uranium alloy is wasted by current practice, there is need for commercially viable process technology to recover uranium alloy from mixtures with other materials, particularly mixtures comprising uranium oxide, uranium fluoride, or magnesium fluoride. The present invention offers pretreatments of such mixtures to prepare them for uranium-alloy recovery by melting and separation.

Chemical Background: The melting point of uranium, 1133° C., is also substantially that for alloys of interest to the present disclosure. That melting point is far below those of uranium oxides, e.g., $UO_2$ at 2875°. No molten oxides unreactive with uranium alloy are available to dissolve away these oxides from molten uranium alloy—unless the oxide can be removed, the droplets of molten uranium alloy will not agglomerate to useful billets. Uranium oxide can be reduced by magnesium in molten salt of proper density to sink uranium alloy while floating away the solid magnesium oxide by-product (see Prior Art), thereby achieving separation of uranium alloy with magnesium oxide. However, commercial operations would be simpler if magnesium-containing by-product could be removed as a liquid rather than as solid magnesium oxide. The present invention offers pretreatment to provide such a liquid by-product.

The melting point of magnesium fluoride can be reduced below that of uranium alloy by the formation of molten-salt solution, i.e., by the addition of other salts, several of which are substantially unreactive toward uranium alloy. Stability in the presence of uranium alloy, so long as the temperature is low enough to prevent metal or compound vaporization, is shown by the lower-valence halides of the alkali and alkaline earth metals, and of scandium, yttrium, and the lanthanides. Addition of these materials in some cases reduces the complete-melting (liquidus) temperature of magnesium fluoride solutions several hundred degrees below that of pure magnesium fluoride.

Table 1 lists examples of liquidus temperatures for different mole fractions of magnesium fluoride with the listed compounds. This table suggests the large variations in liquidus temperatures caused by additions of different solutes in different amounts.

For melting at atmospheric pressure, other salts such as those in Table 1 should usually be added to magnesium fluoride: Lowering the liquidus temperature and operating near the melting point of uranium (1133°) reduces the reversal of the magnesium-plus-uranium-fluoride reduction:

Net reduction reaction at the melting point of uranium:

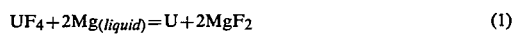

$$UF_4 + 2Mg_{(liquid)} = U + 2MgF_2 \tag{1}$$

Net reverse reaction if the temperature is 50° C. above the melting point of pure magnesium fluoride and at atmospheric pressure:

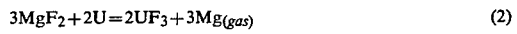

$$3MgF_2 + 2U = 2UF_3 + 3Mg_{(gas)} \tag{2}$$

Of course, reaction 1 is the one desired.

Similar reactions apply for the uranium alloys of interest in this invention.

TABLE 1

| | Approximate liquidus temperatures in °C. at different mole fractions of magnesium fluoride. | | | | |
|---|---|---|---|---|---|
| Mole fraction-> | 1.00 | 0.90 | 0.75 | 0.50 | 0.25 |
| Salt added | | | | | |
| $MgCl_2$ | 1261 | 1200 | 1100 | 900 | 650 |
| $CaF_2$ | 1261 | 1200 | 1100 | 950 | 1175 |
| $CaCl_2$ | 1261 | 1200 | 1050 | 950 | 850 |
| $BaF_2$ | 1261 | 1250 | 1200 | 1075 | 910 |
| LiF | 1261 | 1225 | 1200 | 1000 | 775 |
| NaF | 1261 | 1200 | 1050 | 1030 | 850 |
| NaCl | 1261 | 1200 | 1100 | 1050 | 1050 |
| KF | 1261 | 1250 | 1100 | 1070 | 910 |

As the liquidus temperature is reduced further below the uranium melting point, reaction 1 moves more completely to the right, but, of course, the uranium is then solid. One advantage to operating with temperatures below the uranium melting point is that molten magnesium (boiling point 1090°) can be floated at the surface of the molten salt to supply magnesium to produce uranium alloys from uranium compounds which may be present (see Prior Art).

Magnesium oxide, which was noted as being detrimental for the separation of molten uranium alloy and molten magnesium fluoride, can form when magnesium and hot uranium oxide are contacted. Deposits of uranium oxide, e.g., on oxidized uranium alloy, can be converted to fluorides by reaction with gaseous or aqueous hydrogen fluoride at about room temperature, and such replacement of uranium oxide by uranium fluoride can be used as one step of pretreatment for uranium alloy recovery. Other oxides, e.g., oxides of alloying elements, can also be converted to fluorides. The acid attacks substantially only the oxides because the alloy takes on a protective film of insoluble uranium fluoride which prevents further attack. Water and excess hydrogen fluoride then dry away or can be dried away, e.g., by heating in a fume hood. This pretreatment to convert these oxides to fluorides eliminates the problem of thickening of magnesium-fluoride molten solutions which would occur if the oxides were added to the molten solution.

Uranium alloy which is substantially free of oxygen but which comprises fluorides of magnesium or uranium, e.g., reduction products of uranium fluoride-magnesium reaction, can be separated from these metal fluorides in a molten-salt bath of composition such as those indicated in Table 1. Such a molten-salt bath can be supported on a molten-uranium-alloy trap which permits a uranium alloy stream to pour out for recovery and recycle while the salt moves elsewhere to by-product disposal.

Make up of the salt additive will be required to maintain the selected bath composition as magnesium fluoride is added. For example, if the top of the molten-salt bath were maintained at 1050° with a composition of 0.50 mole fraction of calcium chloride, along with floating magnesium present to react with uranium fluoride, one would have to add as many moles of calcium chloride as were added by fluorides of uranium and magnesium.

An often advantageous pretreatment involves reacting the uranium fluoride with magnesium prior to introduction into the melt, e.g., in a preheating furnace. Such reduction recovers uranium in compounds which otherwise would discharge with excess molten salt. Such reduction can be done as the uranium fluoride and any uranium alloy present are heated, and preheating is one way to add necessary heat to the molten-salt bath.

This reduction during pretreatment avoids the need to maintain molten magnesium floating at the surface of the molten-salt bath. However, some magnesium floating on the molten-salt bath may still be useful to prevent back reaction due to loss of magnesium through vaporization. In principle, it is possible to form even molten uranium alloy prior to introducing the mixture of alloy with metal fluoride into the molten-salt bath.

Prior Art

Elliott, Ser. No. 133,021, "Process and Apparatus for Recovering Uranium Scrap," filed Mar. 22, 1980, discloses cleaning uranium-alloy turnings and other scrap by passing the turnings through a bath of molten salt held by a trap of molten uranium alloy of design similar to that used in the present invention. However, it does not address the value of (a) pretreatments to substantially eliminate oxide contamination prior to use of the molten salt bath or (b) pretreatments to react magnesium with uranium fluoride to form uranium alloy which adds to the desired product. It also does not address the recovery of uranium alloy from mixtures with materials other than oxides.

Elliott, Ser. No. 443,216, "Remelting and Cleaning Scrap Uranium and Plutonium," filed Jan. 28, 1983, is a continuation in part of Ser. No. 133,021 and likewise does not address either pretreatment discussed regarding Ser. No. 133,021.

Elliott, Ser. No. 446,762, "Magnesium Reduction of Uranium Oxide," filed Jan. 27, 1983, discloses the reduction of uranium oxide by magnesium in a molten salt bath comprising salts of high density so that the solid magnesium oxide by-product can be floated away. Again, a similar molten-uranium-alloy trap is used. Although the process does allow alloy recovery from oxidized scrap, the magnesium oxide tends to thicken the molten salt and thereby complicate operations. Again the invention does not address either pretreatment to convert oxide to fluoride prior to further cleaning or conversion of the uranium fluoride to uranium alloy prior to separation of uranium alloy from a molten-salt bath comprising magnesium fluoride.

Elliott, Ser. No. 502,714, "Magnesium Reduction of Uranium Fluoride in Molten Salts," filed June 9, 1983, discloses the reduction of uranium fluoride by magnesium in a molten-salt bath with molten-uranium trap, but it fails to address the separation of uranium alloy from magnesium fluoride if the reduction has been carried out in a preliminary step, e.g., as met in the incompletely separated alloy and salt of some commercial reductions for uranium alloy production.

It is known that hydrochloric acid will dissolve uranium dioxide to form water-soluble uranium chloride, and recent unpublished reports indicate that this acid has been used to dissolve uranium oxide away from uranium alloy prior to melting for recycle. However, such treatment does not recover either the uranium content of the original oxide or the uranium alloy lost to dissolution by the hydrochloric-acid treatment. Hydrofluoric acid, as used in the present invention, would not be a suitable substitute for the hydrochloric-acid dissolution for aqueous removal of uranium-oxide because the resultant uranium fluoride precipitate is water insoluble. Furthermore, the value of replacing oxide by fluoride in the molten-salt treatments has not been identified elsewhere.

OBJECTS OF THE INVENTION

The object of this invention is to utilize pretreated mixtures comprising uranium alloy and uranium oxide, uranium fluoride, magnesium oxide, or magnesium fluoride followed by separation of the uranium alloy from these treated mixtures in a molten salt-bath suspended on a molten-uranium-alloy trap.

A second object of the invention is to convert uranium oxide to uranium fluoride and other oxides to fluorides prior to the separation.

A third object of this invention is to reduce uranium fluoride to uranium alloy by reaction with magnesium prior to the separation.

Other objects, advantages, and novel features of this invention will be apparent to those of ordinary skill in the art upon examination of the following detailed description of preferred embodiments of the invention and the accompanying drawings.

SUMMARY OF THE INVENTION

A method is provided for pretreating mixtures comprising uranium alloy and uranium oxide, uranium fluoride, or uranium fluoride followed by substantially separating the uranium alloy from these pretreated mixtures in a molten-salt bath suspended on a molten-uranium-alloy trap. If oxide is present it is treated with hydrogen fluoride to convert it to fluoride, and uranium fluoride may be reacted with magnesium to form uranium alloy and magnesium fluoride prior to separation of uranium-alloy product.

DESCRIPTION OF THE PREFERRED EMBODIMENTS

Figure 1:
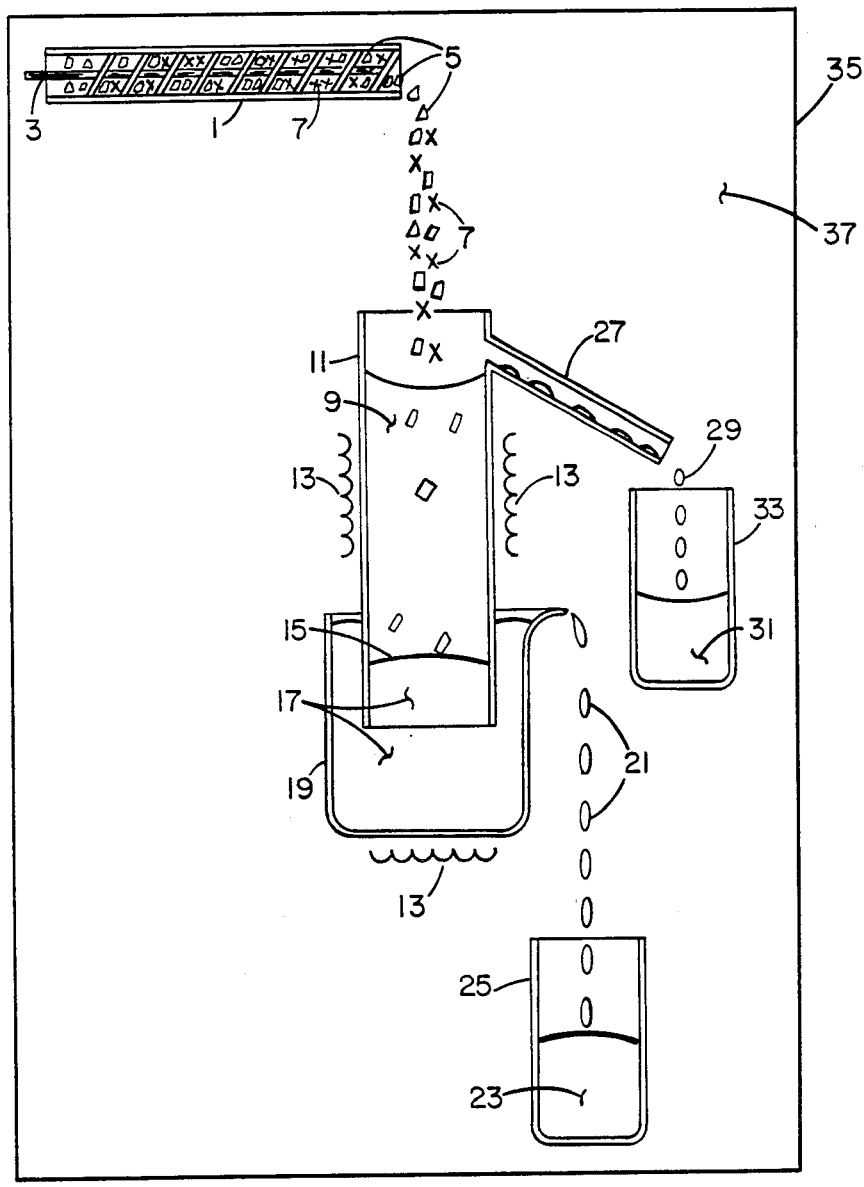
FIG. 1 shows the separation of uranium alloy from a pretreated mixture of uranium alloy with magnesium fluoride; the pretreated mixture enters a molten-salt bath where the components of the mixture melt, allowing uranium alloy to separate through a trap of molten uranium-alloy while excess molten salt is discharged elsewhere.

FIG. 1 shows the preferred embodiment, which is a system for recovering bulk uranium alloy substantially free of nonmetallic impurities from a mixture pretreated to comprise uranium alloy and magnesium fluoride. Such pretreated mixtures of uranium alloy with metal fluoride are met, among other places, in the commercial production of uranium alloy (usually called uranium metal, but an alloy nevertheless): In such production uranium fluoride is reacted with magnesium metal in a pressure-retaining vessel which is expected (a) to release water vapor, which escapes gradually during heating, but (b) to retain magnesium vapor, which would otherwise escape during rapid reaction which forms uranium alloy and magnesium fluoride. If either the escape of water vapor or the retention of magnesium vapor do not follow accepted norms (e.g., because of problems with the pressure vessel), the reactions produce a cake of magnesium fluoride surrounding solidified droplets of uranium alloy. Such mixtures are discarded and buried if current practice is followed.

This preferred embodiment can simply accept such a pretreated mixture, crush it if necessary, and feed it into a molten-salt bath for separation and recovery of uranium-alloy product and disposal of magnesium fluoride by-product. This system is described in FIG. 1. In particular FIG. 1 shows a feeder tube 1 with screw feeder 3 supplies (from hoppers not shown) a mixture of uranium alloy with magnesium fluoride 5 to a molten-salt bath 9. The said mixture was formed by pretreatment reaction of uranium fluoride and magnesium. Also, calcium chloride 7 is fed into the molten-salt bath 9 along with the mixture of uranium alloy and magnesium fluoride 5 so as to maintain approximately 0.50 mole fraction each of magnesium fluoride and calcium chloride in the molten-salt bath, which is held in ceramic tube 11. The molten-salt bath is held at a temperature of approximately 1150° C., heated by furnace heaters 13, furnace not shown. The molten-salt bath floats on an interface 15 with the surface of a molten-uranium-alloy trap 17 which is held in trap cup 19. The mixture of uranium alloy with magnesium fluoride sinks toward the interface 15, melting as it sinks and at the interface. The molten-uranium alloy separates into the molten-uranium-alloy trap 17, causing displacement and dripping of molten-uranium alloy 21 into a uranium-alloy product 23 held in billet cup 25. Excess molten-salt solution moves through discharge conduit 27 and drips 29 to by-product collection 31 in by-product cup 33. The system is held in a container 35 filled with inert gas 37.

The composition of the molten-salt bath 9 is selected from all of the compounds indicated in Table 1, alone or in combination, to produce suitable compositions for the molten-salt bath solution—so long as the composition is molten at the melting point of uranium metal (1133° C.), it will work. Likewise, chlorides and fluorides of scandium, yttrium, and the rare earths and of alkali metals and alkaline earth metals not listed can be added; also similar bromides and iodides could be used, though they are expensive and difficult to purify. The essential compound for the present invention is the magnesium fluoride which, for economically practical operation, must be present in the range 0.35–0.85 mole fraction.

The molten-salt bath immediately above the molten-uranium-alloy trap must be above the melting point of uranium, i.e., in the range 1133°–1300°. The upper portions of the molten-salt bath can be as high as 1200°; it may, however, be advantageous to hold the top of the bath in the range of 775°–1090°, so that excess magnesium metal reductant can be floated at the surface without boiling (atmospheric-pressure boiling at 1090°). Such magnesium would then serve to reduce any uranium fluoride or oxide which might be present.

Figure 2:
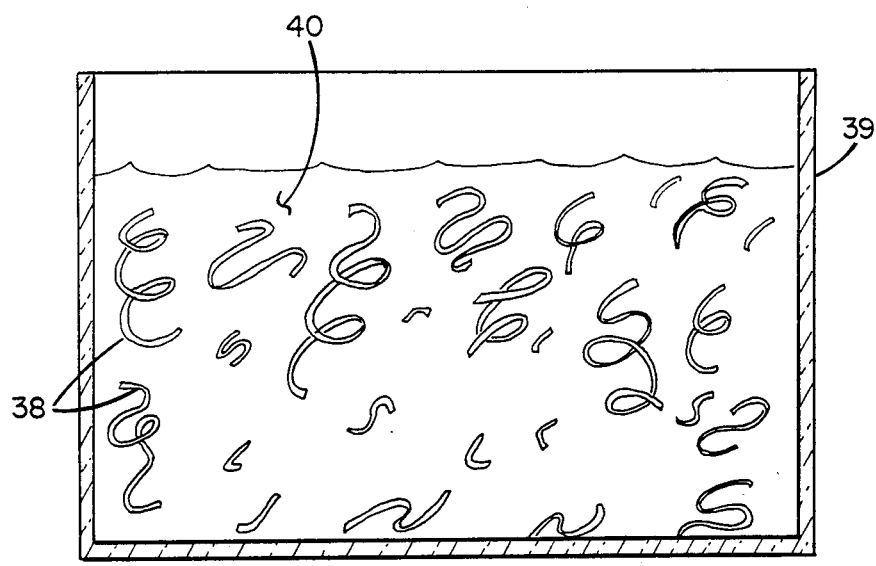
FIG. 2 shows the pretreatment with hydrogen fluoride of a partially oxidized uranium alloy to form a mixture of uranium alloy with uranium fluoride in preparation for separation as in FIG. 1.

FIG. 2 shows another embodiment, which is a system for pretreating partially oxidized uranium alloy for uranium-alloy separation and recovery as in FIG. 1. Such partially oxidized uranium alloy may be from several sources such as machine turnings from penetrator fabrication, fired penetrators recovered from firing pits, or oxidized scrap from unsatisfactory melts at commercial reduction facilities. Here the oxide is treated with hydrogen fluoride, gaseous or aqueous, to convert uranium oxide to uranium fluoride while not substantially dissolving uranium alloy, which alloy becomes coated with a protective film of uranium fluoride.

When dried, such mixtures of uranium alloy with uranium fluoride can be fed into the system in FIG. 1 to separate and recover uranium-alloy product. The system in FIG. 2 does not alone recover the uranium alloy which is present in the uranium fluoride, however.

In FIG. 2 partially oxidized uranium alloy 38, as turnings, was placed in container 39; dilute aqueous hydrogen fluoride 40 was added to cover the partially oxidized uranium alloy. Reaction of hydrogen fluoride 40 with uranium oxide on the partially oxidized uranium alloy 38 converts uranium oxide to uranium fluoride in a few seconds, but the reaction of uranium alloy with dilute aqueous hydrogen fluoride is slow, so longer contacts are little problem. Next the aqueous hydrogen fluoride will be poured off, and the resulting mixture comprising uranium alloy with uranium fluoride will be dried. Such a resulting mixture can be supplied to the feeder 3 in FIG. 1.

So long as the mixture comprising uranium alloy with oxide fits into suitable processing equipment, the treatment is not limited to any particular form, e.g., turnings.

Figure 3:
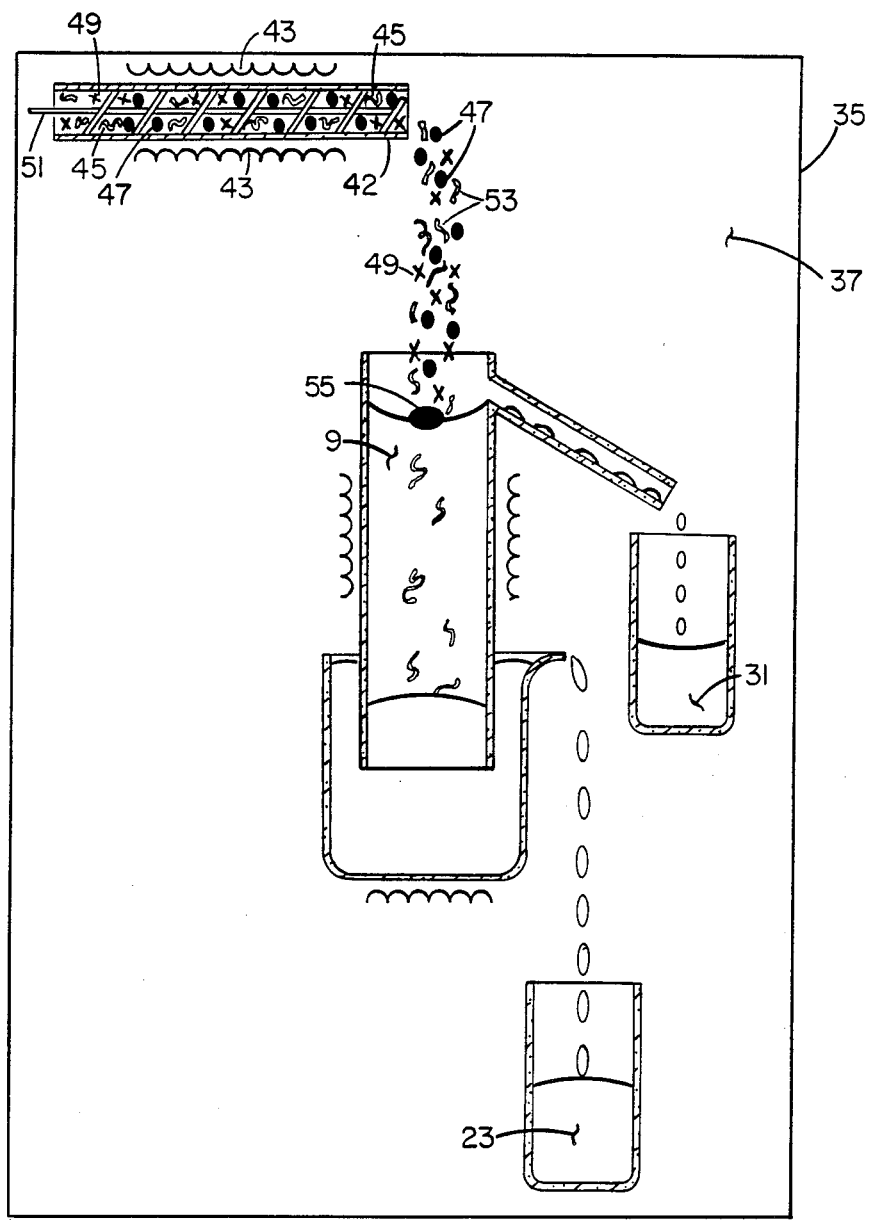
FIG. 3 shows a second step pretreatment plus separation of uranium alloy; the mixture of uranium alloy with uranium fluoride from FIG. 2 is dried then heated with magnesium to produce a mixture of uranium alloy with uranium fluoride and this mixture is fed to a molten-salt bath for separation of uranium alloy from magnesium fluoride as in FIG. 1.

FIG. 3 shows a third embodiment in which mixtures of uranium alloy and uranium fluoride, such as those from FIG. 2, are pretreated to mixtures of uranium alloy with magnesium fluoride prior to separation of uranium-alloy product and by-product comprising magnesium fluoride. The conversion is accomplished by passing a mixture of uranium alloy with uranium fluoride, plus magnesium metal, through a ceramic tube heated to the temperature range 400°–1250°, thereby causing the magnesium to react with the uranium fluoride to form more uranium alloy and magnesium fluoride.

Such mixture of uranium metal and magnesium fluoride, along with other components of a molten-salt bath, are added to a molten-salt bath floating on part of the molten-alloy surface.

FIG. 3 shows an enclosed container 35 with inert atmosphere 37. A ceramic tube 42 is heated in a furnace, not shown, by ceramic-tube heaters 43. Mixtures to be treated, comprising uranium alloy and uranium fluoride 45 plus magnesium 47 and calcium chloride 49 are fed by feeder 51 from a hopper, not shown, through the hot ceramic tube 42. Here the magnesium and uranium fluoride react to form magnesium fluoride and uranium alloy, and calcium chloride is a replacement material added to maintain the composition of the molten-salt bath 9. The pretreated mixture of uranium alloy and magnesium fluoride 53, excess magnesium 47, and calcium chloride 49 fall toward the molten-salt bath 9 where they behave as with FIG. 1, giving uranium-alloy product 23 and by-product 31 comprising magnesium fluoride. Some excess magnesium may be retained floating 55 on the molten-salt bath.

All of the preferred embodiments apply for other uranium alloys, and it is intended that the embodiments can be used with all the military- and civilian-alloy compositions in which depleted-uranium alloys are used. Likewise, the separation will be effected whether solid or molten alloy is introduced into the molten-salt bath. The reference to depleted uranium is not intended to limt the invention, which applies to all isotopic compositions for uranium.

Similarly, comments regarding uranium fluoride, uranium oxide, magnesium fluoride, magnesium oxide, and uranium alloys are intended to apply for mixtures which comprise other materials as well as these materials.

Certain magnesium alloys can replace substantially pure magnesium for reductions.

The foregoing description of preferred embodiments of the invention have been presented for purposes of illustration and description. It is not intended to be exhaustive or to limit the invention to the precise form disclosed, and obviously many modifications and variations are possible in light of the teaching. In particular, many compositions are possible for the bath of molten-salt solution, and many temperature ranges can be used with different compositions. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of recovery of uranium alloy from a mixture of uranium alloy with magnesium fluoride comprising:
   (a) pretreating uranium fluoride with magnesium at 400°–1250° C. to form a pretreated mixture of uranium and magnesium fluoride,
   (b) introducing said pretreated mixture into a molten-salt bath floating on a molten-uranium-alloy trap,
   (c) allowing said bath to transfer heat to said pretreated mixture to cause the said magnesium fluoride to dissolve into said molten-salt bath and said uranium alloy to be molten,
   (d) allowing molten uranium alloy from said pretreated mixture in said bath to separate from said bath into said trap,
   (e) discharging separated molten-uranium alloy from said trap, and
   (f) discharging non-alloy components of said pretreated mixture along with excess molten salt from said bath.

2. A method according to claim 1 in which components of the said molten-salt bath are added along with the said pretreated mixture to maintain the composition of the said bath.

3. A method according to claim 1 in which the temperature of the said trap is in the range 1133°–1300° C.

4. A method according to claim 1 in which the upper portion of said bath is maintained in the range 775°–1200° C.

5. A method according to claim 4 in which magnesium floats at the surface of said bath.

* * * * *